March 9, 1926.                                              1,576,269
J. H. DURANT ET AL
CHECK VALVE
Filed June 11, 1925
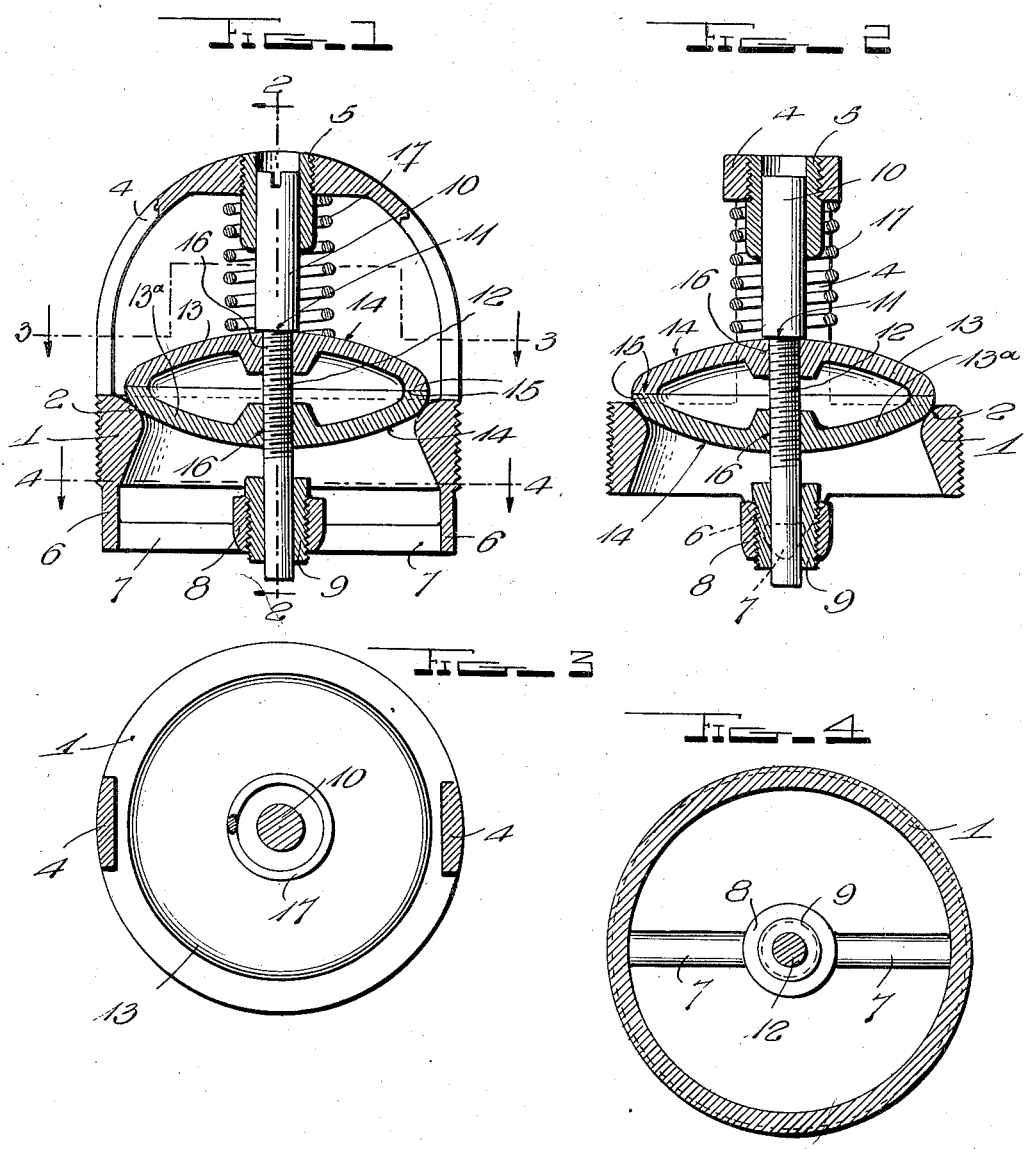
Inventors
John H. Durant,
Frank Vachal,
By H. B. Willson & Co
Attorneys
Witness Patented Mar. 9, 1926.

1,576,269

UNITED STATES PATENT OFFICE.

JOHN H. DURANT AND FRANK VACHAL, OF PORTLAND, OREGON.

CHECK VALVE.

Application filed June 11, 1925. Serial No. 36,492.

*To all whom it may concern:*

Be it known that we, JOHN H. DURANT and FRANK VACHAL, citizens of the United States, residing at Portland, in the county of Multnomah and State of Oregon, have invented certain new and useful Improvements in Check Valves; and we do declare the following to be a full, clear, and exact description of the invention, such as will enable others skilled in the art to which it appertains to make and use the same.

Our invention relates to improvements in check valves and more particularly to those which are designed for use in fluid pumps, for instance, simplex, duplex, compound and vacuum pumps.

One object of the invention is to provide an exceptionally simple, yet an efficient and reliable check valve which may be easily assembled and installed and will allow high efficiency from the pump with which it is used.

Another aim is to provide a novel construction and association of parts whereby either one of a pair of seat-engaging surfaces of the movable valve member, may be brought into engagement with the seat.

With the foregoing in view, the invention resides in the novel subject matter hereinafter described and claimed, the description being supplemented by the accompanying drawing.

Figure 1 is a longitudinal sectional view through a valve constructed in accordance with our invention.

Figure 2 is a second longitudinal section on line 2—2 of Fig. 1.

Figures 3 and 4 are transverse sectional views on lines 3—3 and 4—4 of Fig. 1.

In the drawing above briefly described which illustrates the preferred details of construction, the numeral 1 designates an externally threaded ring internally beveled at one edge to provide a seat 2, the ring preferably being internally flared from the seat to its opposite edge. A one-piece arched yoke 4 has its ends integral with or otherwise joined to the seated edge of the ring 1, said yoke having a central opening in which a stem-guiding bushing 5 is removably threaded. Projecting from the edge of the ring 1, remote from the seat 2, we have shown a pair of lugs 6 which support a spider, said spider preferably comprising two arms 7 and a hub 8, a second relatively small stem-guiding bushing 9 being threaded into this hub. The two bushings 5 and 9 are in alinement with each other and they are co-axial with the seat 2.

A straight valve stem 10 is slidably received in the bushings 5 and 9 and is provided between its ends with a shoulder 11 which faces toward the bushing 9, and the portion 12 of the stem, between said shoulder and the part of the stem which is received in the bushing 9 is externally threaded. Either of two types of valve members may be mounted upon the stem for co-action with the seat 2.

In Figs. 1 and 2, a valve member is shown which comprises two duplicate metal disks 13 and 13ª, each having a convex outer side 14. The inner sides of these disks may be of any desired formation but portions of said sides are flat as indicated at 15, so that the flat portion of one disk may contact tightly with the flat portion of the other. At their centres, the two disks are formed with openings 16 through which the threaded portion 12 of the stem 10 is threaded. The convex side of the disk 13 directly abuts the shoulder 11 and said disk is threaded tightly in place, and when the disk 13ª is threaded onto the stem into tight contact with the disk 13, the two disks relatively lock each other against accidental rotation, in much the same manner as a lock nut is used for securing an ordinary nut upon a bolt or the like.

The peripheral portion of the disk 13ª is shown co-operating with the seat 2 and held normally in engagement therewith by a coiled compression spring 17 which acts against the valve member and re-acts against the yoke 4. Whenever grinding is necessary this may be done and when the disk 13ª is so worn as to be inefficient, the stem 10 is unthreaded from the two disks and removed from the stem guides 5 and 9 of the cage. Then, the disks 13 and 13ª may be inverted so that the disk 13 is presented for co-operation with the seat 2. When the stem is now reinserted through the bushing 5, threaded through the openings 16, and has its lower end received in the bushing 9, the valve is in readiness for further operation and is practically as good as new. As long as the stem is engaged with the disks 13 and 13ª, neither of its ends can disengage from their respective guide bushings, so that there is no danger of the valve sticking open on this account. It will also be observed that as both ends of the stem 10 are at all times guided by the bushings, the valve must always accurately seat as it closes.

The form of valve member so far described, is preferably used when pumping extremely hot water or oil, but may be employed for other purposes. When one side of the valve is so worn as to be inefficient, the stem is removed and the valve inverted, to present the opposite convex side of the body for co-action with the seat, so that additional life is imparted to the structure.

Excellent results are obtainable from the details disclosed and they are therefore preferably followed. However, within the scope of the invention as claimed, modifications may be made.

We claim:

1. A valve comprising a cage having an annular seat and central stem guides at opposite sides thereof, a reversible valve co-operable with said seat and having a central threaded opening alined with said stem guides, and a straight stem threadedly engaged in said opening and having its ends slidably received in said guides, said stem normally retaining the valve in the cage but permitting removal and reversal of said valve when unthreaded from said opening and withdrawn from the stem guides.

2. A valve comprising a ring having a beveled valve seat at one edge, a yoke whose ends are secured to said ring at said one edge thereof, a spider carried by the other edge of said ring, said yoke and said spider having central alined stem guides, a reversible valve engaged with said seat and having a central opening alined with said guides, a straight stem having a reduced end portion threaded through said valve and projecting beyond one side thereof into sliding engagement with one of said guides, the other end portion of the stem having a shoulder abutting the other side of the valve and being slidably received in the other of said guides, said stem normally retaining the valve in the cage but permitting removal and reversal of said valve when unthreaded from said opening and withdrawn from the stem guides.

3. In a reversible valve structure, a threaded stem having an external shoulder, a valve member threaded on said stem and having a convex side abutting said shoulder, and a second valve member threaded on said stem and of the same formation as the first named member, the sides of the two members opposite their convex sides being in tight contact, whereby they serve to lock each other against accidental rotation and removal said stem extending from the opposed convex sides for reception in stem guides.

In testimony whereof we have hereunto affixed our signatures.

JOHN H. DURANT.
FRANK VACHAL.